(12) United States Patent
Sakurai

(10) Patent No.: US 11,599,735 B2
(45) Date of Patent: Mar. 7, 2023

(54) WIRELESS TAG READER AND BASKET DEVICE

(71) Applicant: TOSHIBA TEC KABUSHIKI KAISHA, Tokyo (JP)

(72) Inventor: Wataru Sakurai, Izu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/527,060

(22) Filed: Nov. 15, 2021

(65) Prior Publication Data

US 2022/0261563 A1 Aug. 18, 2022

(30) Foreign Application Priority Data

Feb. 18, 2021 (JP) .............................. JP2021-024291

(51) Int. Cl.
*G06K 7/10* (2006.01)

(52) U.S. Cl.
CPC ..... *G06K 7/10366* (2013.01); *G06K 7/10316* (2013.01)

(58) Field of Classification Search
CPC ....................... G06K 7/10366; G06K 7/10316
USPC ................................................ 235/383, 451
See application file for complete search history.

(56) References Cited

U.S. PATENT DOCUMENTS

| | | |
|---|---|---|
| 2009/0045978 A1 | 2/2009 | Weitzhandler et al. |
| 2016/0300455 A1* | 10/2016 | Hutchings .......... G06Q 20/3276 |
| 2017/0004336 A1 | 1/2017 | Lim |
| 2018/0336383 A1 | 11/2018 | Roth |
| 2019/0270469 A1 | 9/2019 | Yokoyama et al. |

OTHER PUBLICATIONS

Extended European Search Report dated May 25, 2022 in corresponding European Patent Application No. 21213374.8, 5 pages.

* cited by examiner

*Primary Examiner* — Jamara A Franklin
(74) *Attorney, Agent, or Firm* — Kim & Stewart LLP

(57) ABSTRACT

A wireless tag reader that is attachable to a basket used for storing an object to which a wireless tag is attached includes a body portion that houses a processor configured to read tag information stored in the wireless tag, an antenna extending from or included in the body portion and through which radio waves are transmitted to and received from the wireless tag, and a holding portion attachable to an upper edge part of the basket and including an upper plate part rotatably connected to the body portion, a lower plate part facing the upper plate part, and a biasing member between the upper and lower plate parts and by which one of the upper and lower plate parts is biased towards the other while the upper edge part is sandwiched by the upper and lower plate parts.

20 Claims, 18 Drawing Sheets

WIRELESS TAG READER AND BASKET DEVICE

CROSS-REFERENCE TO RELATED APPLICATION

This application is based upon and claims the benefit of priority from Japanese Patent Application No. 2021-024291, filed Feb. 18, 2021, the entire contents of which are incorporated herein by reference.

FIELD

Embodiments described herein relate generally to a wireless tag reader and a basket device.

BACKGROUND

In recent years, RFID (Radio Frequency Identification) technology has been utilized in distribution systems, logistic systems, and the like. In such systems, tag information about an article or a commodity is read from an RFID tag (hereinafter, also referred to as a wireless tag) attached to the article or the commodity and processed.

There has been proposed a wireless tag reader that can be detachably attached to a shopping cart at a retail sales store such as a supermarket. In this shopping cart of the related art, the wireless tag reader is attached to the bottom surface of a storage region of the shopping cart into which products to which a wireless tag has been attached can be placed. When the customer puts a product into the shopping cart, information can be read from the wireless tag by the wireless tag reader.

The information (commodity information) read by the wireless tag reader is ultimately transferred to a checkout machine in accordance with an operation of a customer at the time of checkout processing. Accordingly, the customer can perform the checkout processing using the checkout machine for the items put into the shopping cart. By adopting such a shopping cart provided with a wireless tag reader, it is possible to more conveniently perform registration of commodity information (commodity registration) for a sales transaction. In addition, since the RFID tag reader can be attached when the customer is using the shopping cart and detached when the customer does not use the shopping cart, it is generally not necessary to attach wireless tag readers to all shopping carts in the store at the same, and it is possible to reduce the financial burden on the store associated with adoption of such a system.

However, in the shopping cart of the related art described above, a plurality of commodities may be stacked one upon the other when placed in the shopping cart. For this reason, the wireless tag reader may not always properly read tag information from the wireless tags attached to the commodities being stored in the shopping cart if subsequently placed items are blocked from the wireless tag reader by previously placed items. For example, in a case where a commodity comprising metal is stored first, there is a possibility that the radio waves output from the wireless tag reader will be reflected or blocked by the metal or that the metal commodity may interfere with a response wave output from the wireless tag of the later placed commodity, and thus the wireless tag reader cannot read the tag information included in the response wave.

DETAILED DESCRIPTION

In general, according to one embodiment, a wireless tag reader attachable to a basket for storing an object to which a wireless tag is attached, includes a body portion that houses a processor configured to read tag information stored in the wireless tag, an antenna extending from or included in the body portion and through which radio waves are transmitted to and received from the wireless tag, and a holding portion attachable to an upper edge part of the basket. The holding portion includes an upper plate part rotatably connected to the body portion, a lower plate part facing the upper plate part, and a biasing member between the upper and lower plate parts and by which one of the upper and lower plate parts is biased towards the other in a state in which the upper edge part is sandwiched by the upper and lower plate parts.

Hereinafter, a wireless tag reader and a basket device according to certain embodiments will be described with reference to the drawings. Note that the present disclosure is not limited to the example embodiments described below. For example, in the embodiments described below, a basket device to which a wireless tag reader is attached is a shopping basket used in a mass retailer (hereinafter, also referred to as a store) such as a supermarket. However, the various embodiments may be applied to a shopping cart or the like. Further, the above-described basket device may be any type of storage body which stores components or parts and is used for component management in a factory or the like.

First Embodiment

Figure 1:
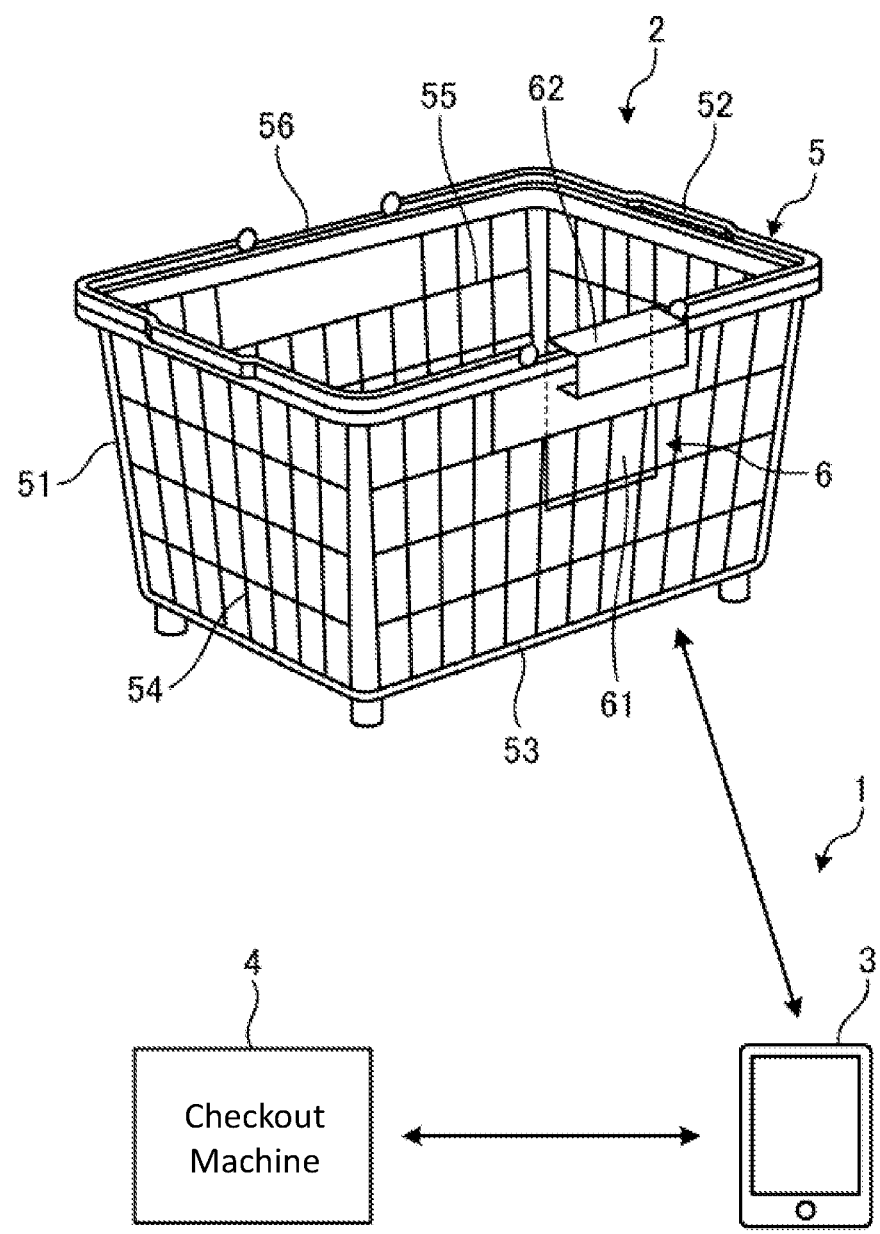
FIG. 1 is a diagram illustrating a checkout system including a basket device according to a first embodiment.

A first embodiment will be described below. FIG. 1 is a diagram illustrating a checkout system 1 according to a first embodiment. The checkout system 1 comprises a basket device 2, a mobile device 3, and a checkout machine 4.

The basket device 2 includes a basket 5 and a wireless tag reader 6 detachably held on an upper part of the basket 5.

The mobile device 3 is a smartphone, a tablet terminal, or the like owned by a customer or rented (or otherwise provided) by a store, and stores one or more application programs executed in the checkout system 1. The mobile device 3 performs various types of processing related to commodity registration and checkout processing in response to a customer's operation. For example, the mobile device 3 acquires and stores commodity information read by the wireless tag reader 6 from a wireless tag attached to a commodity through wireless communication. The mobile device 3 transmits the stored commodity information to the checkout machine 4 by wireless communication. The commodity information indicates a commodity code, a price, a commodity name, and the like for specifying the commodity to which the wireless tag is attached.

The checkout machine 4 is, for example, a so-called self-service type checkout machine in which a customer performs a checkout operation by himself or herself. The checkout machine 4 executes checkout processing by cashless settlement or cash settlement such as credit settlement based on the commodity information received from the mobile device 3. The checkout processing includes processing for making payment for a commodity to be purchased by a customer.

The basket 5 is provided by a store and carried by a customer who does shopping in the store. The basket 5 has a storage part 51 and grip parts 52 rotatably attached to an upper end of the storage part 51.

The storage part 51 is formed in a recessed shape having a bottom surface part 53 and a peripheral surface part 54 extending from the bottom surface part 53, and stores one or more commodities inside. The bottom surface part 53 and the peripheral surface part 54 are formed of an open lattice material. The storage part 51 has an upper opening 55 formed by an annular opening edge part 56, which is an upper end of the peripheral surface part 54. Hereinafter, a side of the storage part 51 where the bottom surface part 53 is located will be described as a lower side, and a side of the storage part 51 where the upper opening 55 is located will be described as an upper side.

A commodity is stored in the storage part 51 through the upper opening 55. A wireless tag is attached to the commodity and stores commodity information related to the commodity as tag information.

The grip parts 52 are provided as a pair to be held by a customer during shopping, and are rotatably attached to the opening edge part 56. In a state in which a plurality of baskets 5 are stacked at the shopping basket storage space in a store, the grip parts 52 of each basket 5 are laid down and placed on the opening edge part 56 as shown in FIG. 1. Further, in a state of being carried by the customer, it is lifted and protrudes above the opening edge part 56.

Next, a configuration of the wireless tag reader 6 will be described in detail. The wireless tag reader 6 is detachably held on an upper part of the basket 5. Here, the upper part of the basket 5 refers to a part of the basket 5 above the bottom surface part 53. The wireless tag reader 6 is held by or attached to the basket 5 by a customer or a store clerk when the customer intends to use the basket 5. When the customer finishes shopping, the basket 5 is returned to the store clerk, and the store clerk removes the wireless tag reader 6 from the basket 5 and sets the wireless tag reader 6 in a charger (not shown) to charge a battery 64 (see FIG. 2) included in the wireless tag reader 6. By making the wireless tag reader 6 attachable to and detachable from the basket 5, it is not necessary to attach the wireless tag reader 6 to each of all the shopping baskets 5 in the store, and it is possible to reduce the financial burden on the store. The wireless tag used in the present embodiment is a passive type wireless tag that operates using radio waves from the wireless tag reader 6 as a power source.

Figure 2:
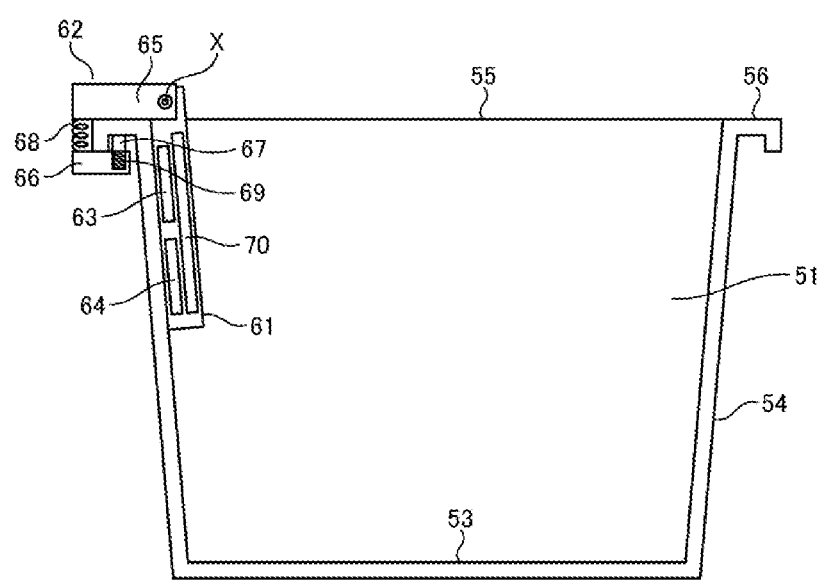
FIG. 2 is a diagram schematically illustrating a cross section of a basket device to which a wireless tag reader is attached according to a first embodiment.
Figure 3:
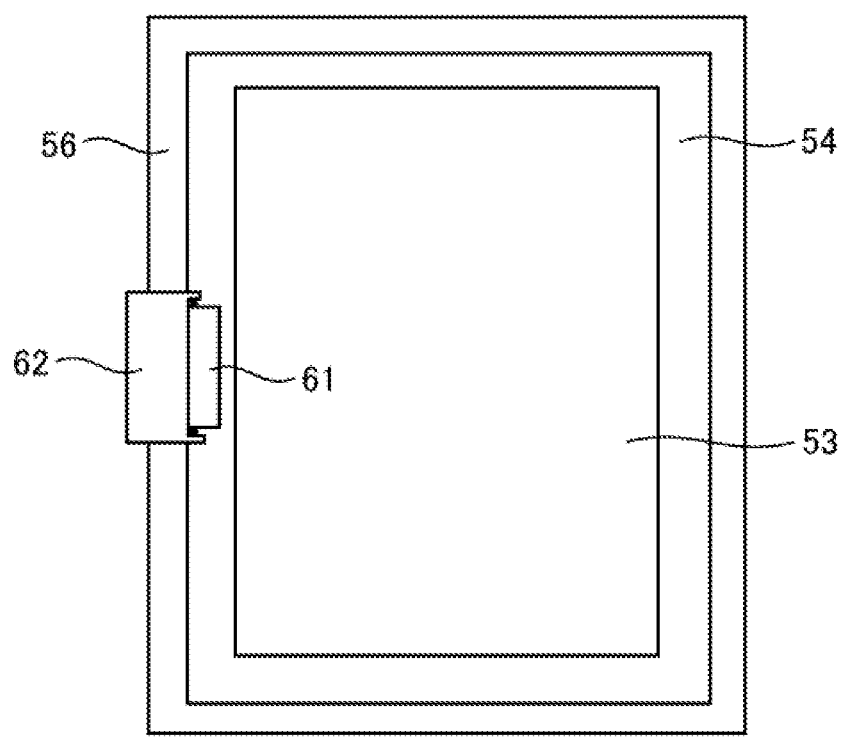
FIG. 3 is an upper surface of a basket device to which a wireless tag reader is attached according to a first embodiment.

The wireless tag reader 6 comprises a main body portion and a holding portion 62. FIG. 2 is a diagram schematically showing a cross section of the basket 5 to which the wireless tag reader 6 is attached. FIG. 3 is a diagram schematically illustrating an upper surface of the basket 5 to which the wireless tag reader 6 is attached.

As shown in FIG. 2, in a state where the wireless tag reader 6 is attached to the basket 5, the main body portion 61 is positioned inside the storage part 51 and held on an upper portion of the peripheral surface part 54. The main body portion 61 houses an antenna 70, a control device 63, and a battery 64.

The antenna 70 transmits and receives radio waves to and from a wireless tag attached to a commodity. Specifically, the antenna 70 transmits radio waves toward the inside of the storage part 51 and thus towards the wireless tag attached to the commodity stored in the storage part 51 through the upper opening 55, and receives a radio wave in response to the radio wave from the wireless tag. In the following description, the radio wave transmitted by the antenna 70 may be referred to as an interrogation wave, and the radio wave received by the antenna 70 from the wireless tag may be referred to as a response wave.

The control device 63 comprises various electrical components including a control unit 600 (refer to FIG. 6) and the like of the wireless tag reader 6. The battery 64 supplies electric power to each component of the wireless tag reader 6. The battery 64 is charged when the wireless tag reader 6 is detached from the basket 5 and placed on a charging stand or the like.

The holding portion 62 is connected to the main body portion 61 that houses the antenna 70, and is detachably attached to the opening edge part 56 of the basket 5, thereby detachably holding the antenna 70 on the upper part of the peripheral surface part 54. The holding portion 62 includes an upper plate part 65, a lower plate part 66, a sandwiching part 67, a first biasing member 68, and a second biasing member 69.

The upper plate part 65 is rotatably attached to the main body portion 61 with respect to a rotation axis X. The upper plate part 65 is placed on the opening edge part 56 in a state in which the wireless tag reader 6 is attached to the basket 5. The lower plate part 66 is separated from the upper plate part 65 by a predetermined distance, and is connected to the upper plate part 65 via the first biasing member 68. The sandwiching part 67 is provided so as to protrude upward from the lower plate part 66, and is connected to the lower plate part 66 via the second biasing member 69. The opening edge part 56 is sandwiched by the lower plate part 66 and the sandwiching part 67 and the upper plate part 65 in a state in which the wireless tag reader 6 is attached to the basket 5.

Figure 4:
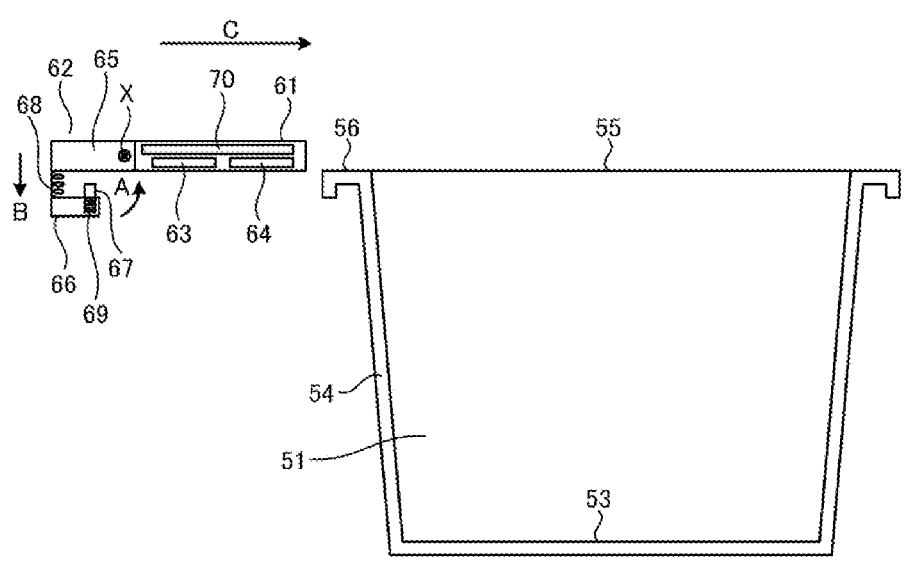
FIG. 4 is a diagram illustrating how a wireless tag reader is attached to a basket device according to a first embodiment.
Figure 5:
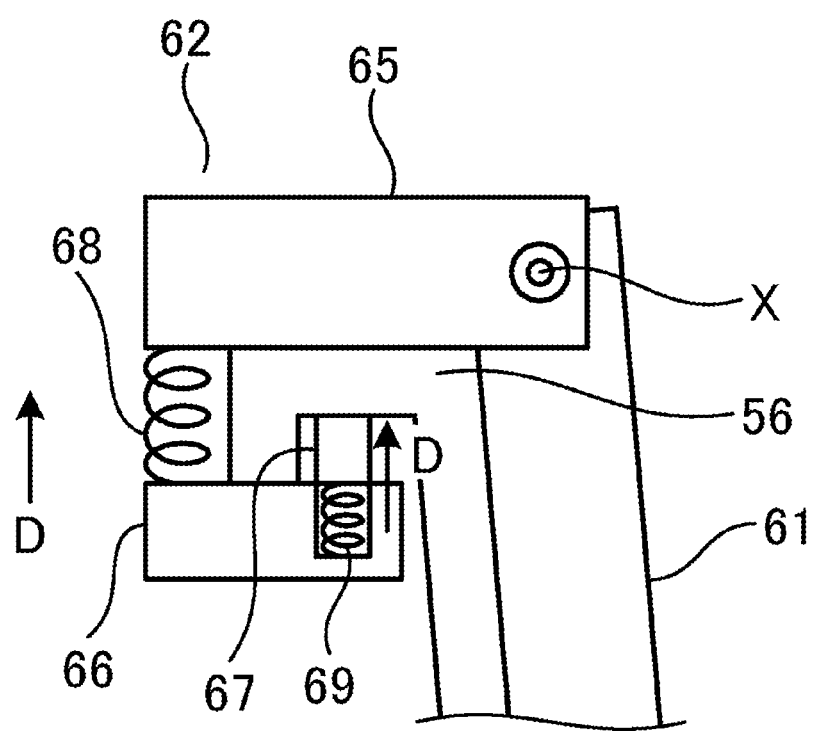
FIG. 5 depicts a connection of a wireless tag reader and a basket device according to a first embodiment.

Next, a method of attaching the wireless tag reader 6 to the basket 5 will be described. FIG. 4 illustrates how the wireless tag reader 6 is attached to the basket 5. FIG. 5 depicts a connection of the wireless tag reader 6 and the basket 5.

In order to attach the wireless tag reader 6 to the basket 5, first, the main body portion 61 is rotated about the rotation shaft X in the direction of arrow A such that the main body portion 61 and the upper plate part 65 of the holding portion 62 are on the same plane as illustrated in FIG. 4. Next, the lower plate part 66 is pulled towards the direction of arrow B against the biasing force of the first biasing member 68, and the wireless tag reader 6 is moved towards the direction of arrow C. At this time, since the lower plate part 66 is largely separated from the upper plate part 65, the wireless tag reader 6 can be moved without the sandwiching part 67, which protrudes upward from the lower plate part 66, contacting the lower end of the opening edge part 56.

Accordingly, the upper plate part 65 is placed on the opening edge part 56. Then, the main body part 61 is rotated in the direction opposite to the arrow A to contact the peripheral surface part 54 of the basket 5. Further, the force pulling the lower plate part 66 towards the arrow B direction is released. Accordingly, the opening edge part 56 is sandwiched by the upper plate part 65 and the lower plate part 66, and the holding portion 62 of the wireless tag reader 6 is attached to the opening edge part 56 of the basket 5.

Specifically, as shown in FIG. 5, the first biasing member 68 is in a state of being longer than its natural length, that is, in an extended state, and applies a force towards the direction of the arrow D to the lower plate part 66. Further, the second biasing member 69 is in a state of being shorter than the natural length, that is, in a contracted state, and applies a force towards the direction of the arrow D to the holding portion 67. Accordingly, the opening edge part 56 is sandwiched by the upper plate part 65 and the lower plate part 66.

In this manner, as shown in FIGS. 2 and 3, the wireless tag reader 6 is held at the upper part of the basket 5. In other words, the holding portion 62 holds the antenna 70 included in the main body portion 61 on the peripheral surface part 54 of the basket 5. Accordingly, it is possible to prevent a commodity stored in the storage part 51 from being stacked on or above the antenna 70. Therefore, the antenna 70 can transmit and receive radio waves to and from the wireless tag attached to a newly-added commodity without interference from another commodity already stored in the storage part 51.

Figure 6:
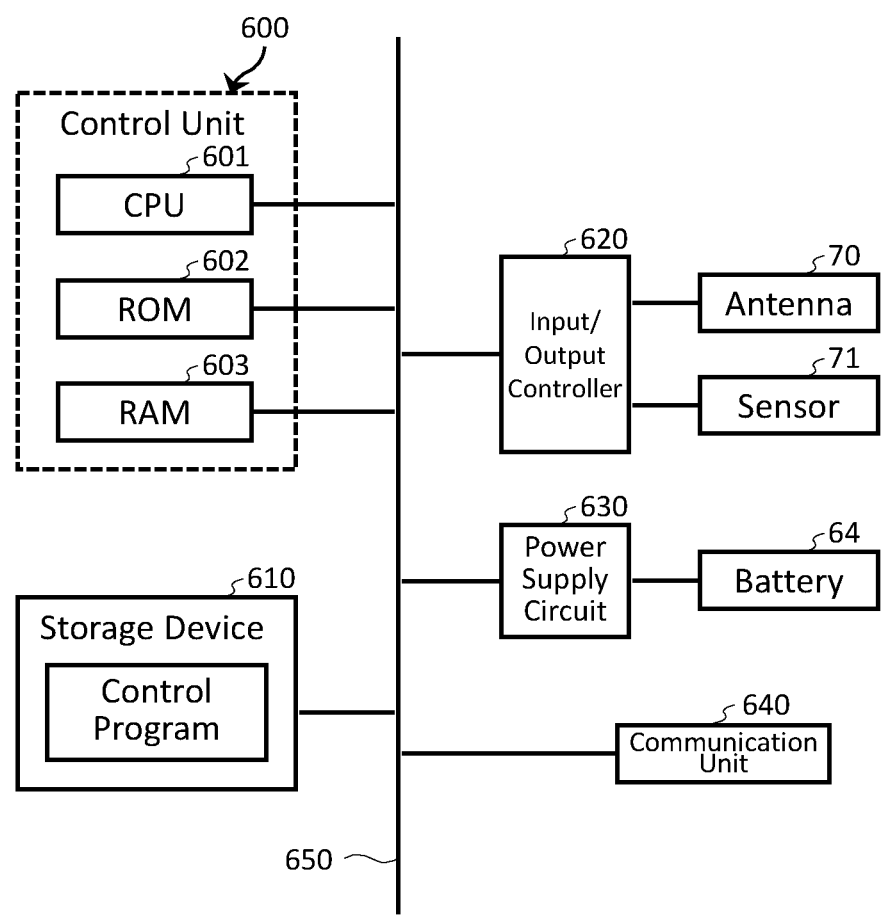
FIG. 6 is a hardware block diagram of a wireless tag reader according to a first embodiment.

Next, a hardware configuration of the wireless tag reader 6 will be described. FIG. 6 is a hardware block diagram of the wireless tag reader 6.

The wireless tag reader 6 comprises a control unit 600, a storage device 610, an input/output controller 620, a power supply circuit 630, and a communication unit 640. The control unit 600, the storage device 610, the input/output controller 620, the power supply circuit 630, and the communication unit 640 are connected to each other via a bus 650.

The control unit 600 includes a CPU (Central Processing Unit) 601, a ROM (Read Only Memory) 602, and a RAM (Random Access Memory) 603. The CPU 601, ROM 602 and RAM 603 are connected to each other via the bus 650.

The CPU 601 controls an entire operation of the wireless tag reader 6. The ROM 602 stores various types of programs executed by the CPU 601 and various types of data. The RAM 603 is used as a work area for the CPU 601 to load various programs and various types of information stored in the ROM 602 and the storage device 610. The control unit 600 executes various control processes of the wireless tag reading device 6 when the CPU 601 executes a control program stored in the ROM 602 or the storage device 610 and loaded onto the RAM 603.

The storage device 610 is, for example, an HDD (Hard Disk Drive) or a flash memory, and maintains various programs and data even when the power is turned off. One of the control programs stored in the storage device 610 is, for example, a control program causing the control unit 600 to execute a function necessary as the wireless tag reader 6.

The input/output controller 620 is connected to the antenna 70 and a sensor 71. The input/output controller 620 is an input/output interface circuit for hardware connected thereto and for controlling the hardware. Accordingly, the control unit 600 can transmit and receive signals to and from the antenna 70 and the sensor 71 via the input/output controller 220, and can control these hardware components based on an instruction from the control unit 600. The sensor 71 detects that the wireless tag reader 6 is attached to the basket 5, and is, for example, a pressure-sensitive sensor provided in the main body portion 61.

The power supply circuit 630 is connected to the battery 64. The power supply circuit 630 is a circuit that supplies power to each hardware of the wireless tag reader 6. The power supply circuit 630 supplies power to each hardware by stepping down a voltage supplied from the battery 64 to each operating voltage.

The communication unit 640 is a network interface circuit for communicating with an external apparatus. For example, the communication unit 640 is connected to the mobile device 3 and outputs the commodity information read by the wireless tag reader 6 to the mobile device 3.

Figure 7:
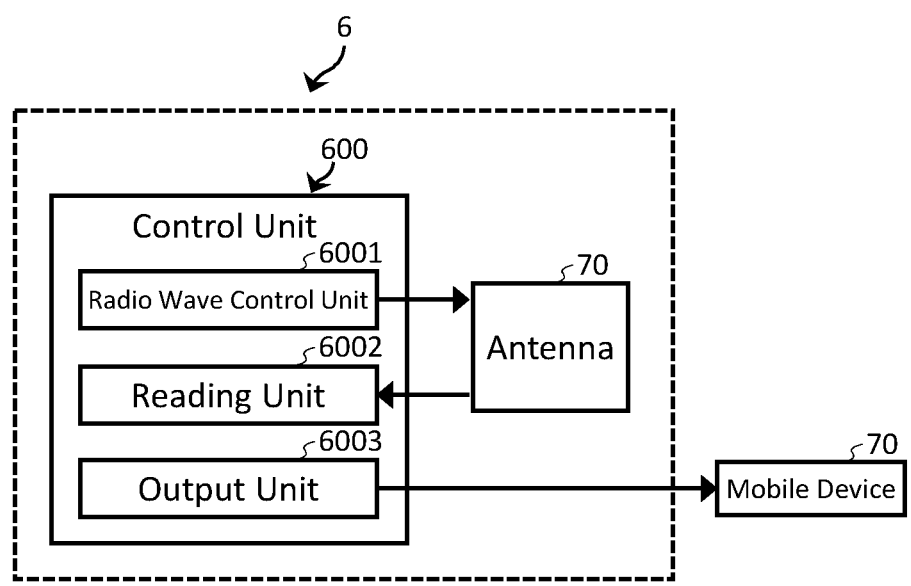
FIG. 7 is a functional block diagram of a wireless tag reader according to a first embodiment.

Next, a functional configuration of the control unit 600 of the wireless tag reader 6 will be described. FIG. 7 is a functional block diagram of the wireless tag reader 6.

The CPU 601 of the control unit 600 performs the functions of a radio wave control unit 6001, a reading unit 6002, and an output unit 6003 according to the control program stored in the ROM 602 and the storage device 610.

The radio wave control unit 6001 controls radio waves transmitted from the antenna 70. Specifically, when the sensor 71 detects that the wireless tag reader 6 is attached to the basket 5, the radio wave control unit 6001 controls the antenna 70 to transmit a radio wave (interrogation wave) at predetermined intervals or continuously. When the sensor 71 detects that the wireless tag reader 6 is removed from the basket 5, the radio wave control unit 6001 stops the transmission of the radio wave from the antenna 70. Further, the radio wave control unit 6001 controls the radio wave intensity of the radio wave transmitted from the antenna 70 so that the radio wave can reach a wireless tag in the storage part 51 of the basket 5 but cannot reach another wireless tag outside the storage part 51, e.g., a wireless tag attached to a commodity displayed on the commodity display shelf in the store.

The reading unit 6002 reads tag information stored in a wireless tag based on a radio wave received by the antenna 70. Specifically, the reading unit 6002 reads tag information included in a response wave transmitted by a wireless tag in response to the radio wave transmitted by the antenna 70. The tag information read by the reading unit 6002 includes the commodity information of the commodity to which the wireless tag is attached.

The output unit 6003 outputs the commodity information included in the tag information read by the reading unit 6002 to the mobile device 3. For example, the output unit 6003 controls the communication unit 640 to transmit the commodity information in response to an instruction signal from the mobile device 3.

A use example of the storage device 2 having the above configuration will be described. When a customer visits the store, the customer takes out a basket 5 from the shopping basket place and a wireless tag reader 6 from the charging stand. Next, the wireless tag reader 6 is attached to the basket 5 by the above-described method. Then, the sensor 71 detects that the wireless tag reader 6 is attached to the basket 5, and the wireless tag reader 6 starts to transmit radio waves from the antenna 70.

The customer moves in the store while carrying the basket 5. When there is a commodity to be purchased, the customer puts the commodity into the storage part 51 through the upper opening 55. In other words, the customer stores the commodity to which a wireless tag is attached in the storage part 51 through the upper opening 55. When the commodity passes through the upper opening 55, the wireless tag attached to the commodity operates upon receiving a radio wave (interrogation wave) from the antenna 70 and transmits a response wave to the antenna 70.

In the wireless tag reader 6, the antenna 70 receives the response wave from the wireless tag, and the reading unit 6002 reads the commodity information included in the response wave. The read commodity information is output from the output unit 6003 to the mobile device 3. The mobile device 3 stores the read commodity information and displays it on its own display unit.

Since the reading unit 6002 performs the reading process at predetermined intervals or continuously, commodity information of a commodity can be read at any time when the customer puts the commodity in the basket 5. Since the reading unit 6002 repeatedly reads the tag information of the same wireless tag in the storage part 51, it executes duplication check for preventing duplicated reading of the same tag information based on the identifier of the wireless tag included in the read tag information. As a result, the reading unit 6002 can read commodity information from a plurality of commodities stored in the basket 5 without duplication. Then, when the reading unit 6002 reads new commodity information, the output unit 6003 outputs the new commodity information to the mobile device 3. The mobile device 3 successively stores the received commodity information and displays it on its own display part. The output unit 6003 may repeatedly output all the commodity information repeatedly read by the reading unit 6002. In such a case, the mobile device 3 compares all the received commodity information with the previously received and stored commodity information, and then stores and displays any newly received commodity information. In other words, the mobile terminal 3 prevents double registration or repeated registration of the same previously registered item(s).

When the customer performs checkout, the commodity information stored in the mobile device 3 is transmitted to the checkout machine 4 according to the operation of the customer. The checkout machine 4 executes checkout processing based on the received commodity information.

According to the first embodiment, the antenna 70 of the wireless tag reader 6 is held at an upper part of the basket 5, for example, at a position close to the upper opening 55 through which a commodity must be taken in and out. In other words, the antenna 70 is held not by the bottom surface part 53 of the basket 5 but by the peripheral surface part 54. As a result, the antenna 70 is less likely to be covered (blocked) by a commodity stored in the storage part 51. In other words, a commodity already stored in the storage part 51 is less likely to interfere with the communication between the antenna 70 and a newly-added commodity that must pass through the upper opening 55.

Therefore, the antenna 70 can transmit and receive radio waves to and from the wireless tag attached to the commodity passing through the upper opening 55 without being affected by the commodity already stored in the storage part 51. Therefore, the wireless tag reader 6 can reliably read the tag information of the wireless tag attached to the commodity stored in the storage part 51 through the upper opening 55. Although the main body portion 61 including the antenna 70, the control device 63, and the battery is held at the opening edge part 56 of the basket 5 in this embodiment, only the antenna 70 may be held thereat. Alternatively, only the antenna 70 may be attached to the peripheral surface part 54. Further, the opening through which the commodity is taken in and out may not be on the upper side of the basket 5.

Further, according to this first embodiment, the holding portion 62 of the wireless tag reader 6 is attached to the opening edge part 56 of the basket 5. Thus, it is possible to more easily attach the holding portion 62 to the basket 5 as compared to a case where the holding portion 62 is attached to the inside of the storage part 51 of the basket 5.

Further, according to the first embodiment, since the holding portion 62 is rotatably provided on the main body portion 61, the main body portion 61 can be easily disposed along the peripheral surface part 54. Therefore, the wireless tag reader 6 can be stored in the basket 5 in a compact manner, and the main body portion 61 does not become an obstacle when a commodity is put into or taken out from the storage part 51.

Second Embodiment

Figure 8:
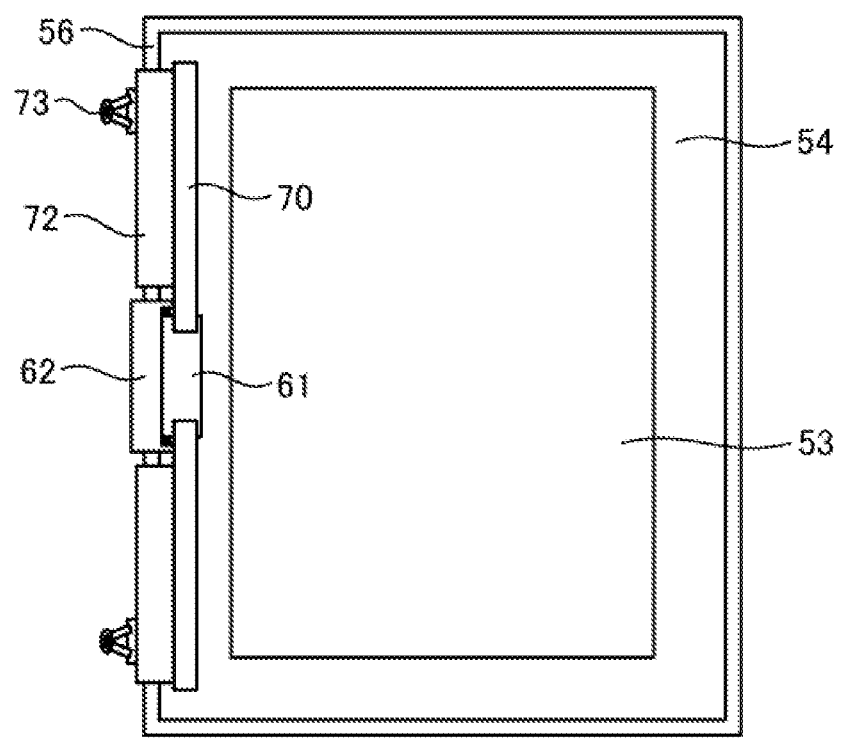
FIG. 8 is a diagram schematically illustrating an upper surface of a basket device to which a wireless tag reader is attached according to a second embodiment.

Next, a second embodiment of the wireless tag reader 6 will be described with reference to the drawings. In the following description, the same configurations as those of the first embodiment are denoted by the same reference numerals, and the description thereof may be omitted. FIG. 8 is a diagram schematically illustrating an upper surface of the basket 5 to which the wireless tag reader 6 is attached.

The wireless tag reader 6 includes one or more antennas 70 attached to a main body portion 61 and protruding from both ends of the main body portion 61. Each antenna 70 according to the present embodiment comprises, for example, a rod-shaped coaxial leakage cable having a slot formed on an outer peripheral surface thereof. Note that, in general, an antenna 70 may be any type of antenna such as a monopole antenna. The main body portion 61 houses various electrical components such as the control device 63 and the battery 64. The holding portion 62 has the same configuration as that of the first embodiment, and is connected to the main body portion 61.

Figure 9:
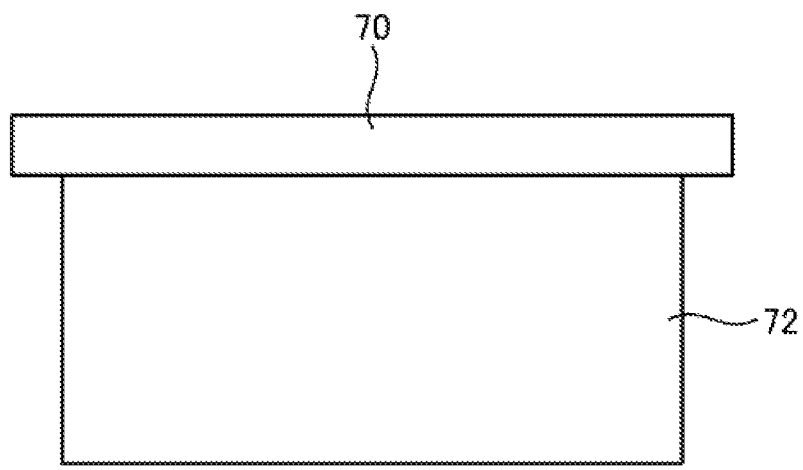
FIG. 9 is a diagram showing a plane of an antenna in a wireless tag reader according to a second embodiment.
Figure 10:
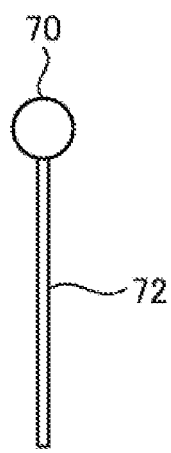
FIG. 10 is a diagram illustrating a side surface of an antenna in a wireless tag reader according to a second embodiment.

FIG. 9 is a plan view of an antenna 70, and FIG. 10 is a side view of an antenna 70. A shield mesh sheet 72 (hereinafter simply referred to as the shield mesh) made of a thin material that blocks radio waves is attached to the antenna 70 so as to extend to one side. The shield mesh 72 is attached to the antenna 70 at a part of the coaxial leakage cable where there is no slot. The shield mesh 72 is attached to the opening edge part 56 of the basket 5 by a clip 73 (see FIG. 8), and functions as a holding portion that detachably holds the antenna 70 on the upper part of the basket 5. Furthermore, the shield mesh 72 also functions as a holding portion that detachably holds the antenna 70 to the peripheral surface part of the basket 5. The clip 73 may be any type of clip that is commercially available.

Figure 11:
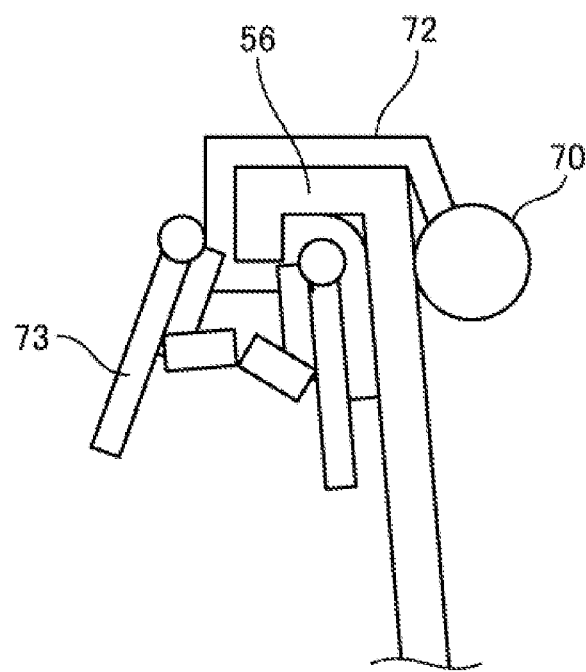
FIG. 11 depicts a connection of an antenna and a basket device of a wireless tag reader according to a second embodiment.

FIG. 11 depicts a connection of the antenna 70 and the basket 5. As shown in FIG. 11, the shield mesh 72 is attached to the opening edge part 56 by the clip 73 in such a manner that the shield mesh 72 will wrap a portion of the opening edge part 56. That is, in this example, the shield mesh 72 is attached to the basket 5 by being sandwiched between the opening edge part 56 and the clip 73. By attaching the shield mesh 72 to the basket 5, the antenna 70 is held at the upper part of the basket 5 and also at the peripheral surface 54 of the basket 5.

According to the second embodiment, as in the first embodiment, the wireless tag reader 6 can reliably read tag information of a wireless tag attached to a commodity being put into the storage part 51 through the upper opening 55. In addition, since the shield mesh 72 (which blocks radio waves) is used for holding the antenna 70, it is possible to help prevent the wireless tag reader 6 from reading tag information form a wireless tag attached to a commodity located outside the storage part 51.

In general, as long as the antenna 70 has sufficient rigidity and is capable of constantly maintaining its state of protruding from the main body portion 61, the described holding mechanism for the antenna 70 with the shield mesh 72 and the clip 73 need not be provided.

Figure 12:
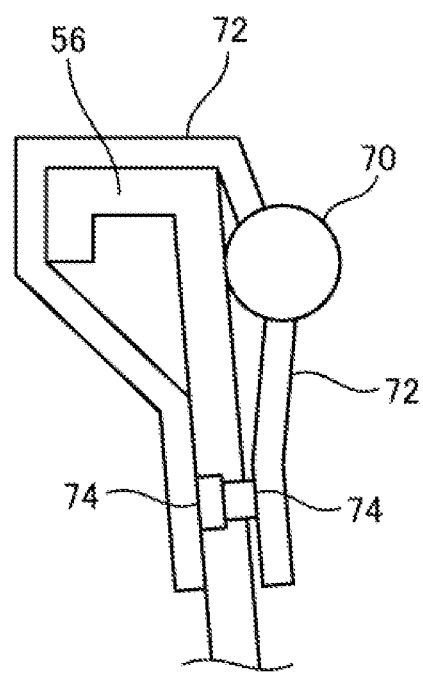
FIG. 12 depicts a connection of an antenna and a basket device of a wireless tag reader according to a modified example.

FIG. 12 depicts a connection of the antenna 70 and the basket 5 according to a modified example. As shown in FIG. 12, in the modified example, a pair of shield meshes 72 protruding in opposite directions from an antenna 70 is provided.

Each of the shield meshes 72 is provided with a pair of engaging portions 74 that engage each other. The pair of engaging portions 74 is formed of, for example, a button or snap arrangement by which the pair interlock or otherwise connect with one another. The engaging portions 74 can be engaged with each other through one of the lattice holes of the peripheral surface part 54. Thus, the antenna 70 can be held in the basket 5.

Third Embodiment

Figure 13:
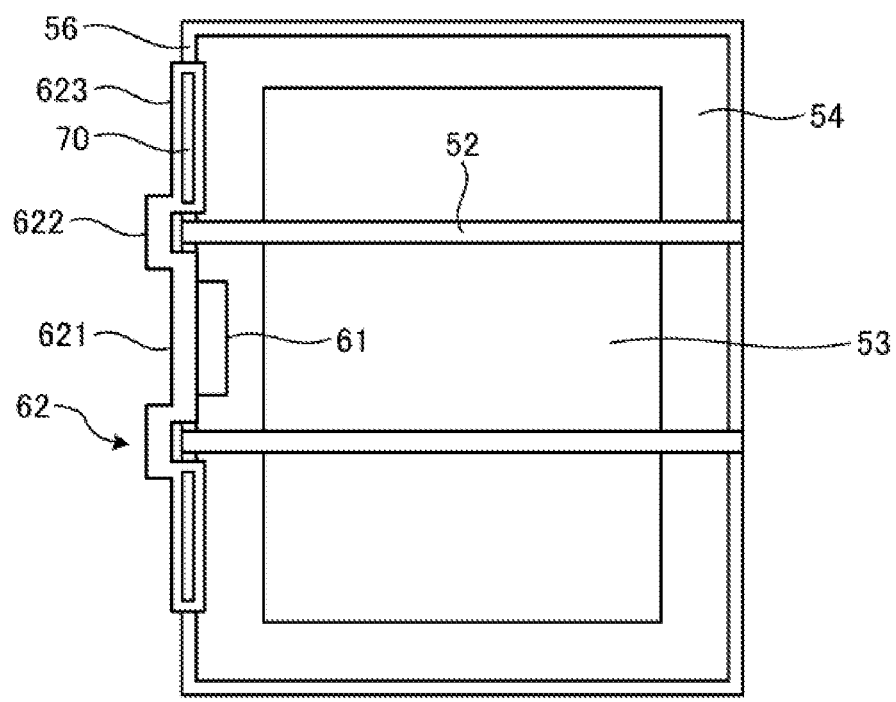
FIG. 13 is a diagram schematically illustrating an upper surface of a basket device to which a wireless tag reader is attached according to a third embodiment.
Figure 14:
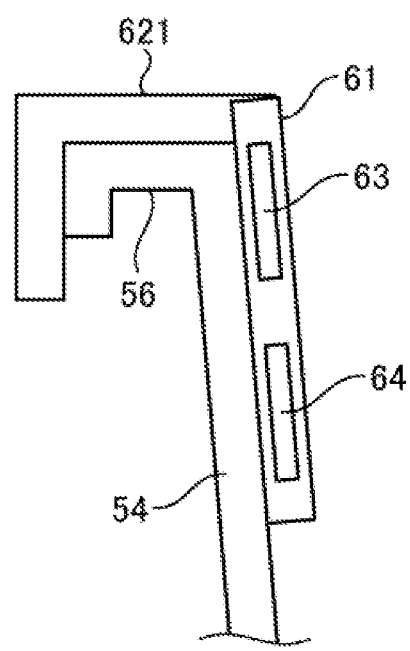
FIG. 14 is a diagram schematically illustrating a cross-section of a basket device to which a wireless tag reader is attached according to a third embodiment.

Next, a third embodiment of the wireless tag reader 6 will be described with reference to the drawings. FIG. 13 is a diagram schematically illustrating an upper surface of the basket 5 to which the wireless tag reader 6 is attached, and FIG. 14 is a diagram schematically illustrating a cross section of the basket 5 to which the wireless tag reader 6 is attached.

The main body portion 61 houses various electrical components such as the control device 63 and the battery 64. The holding portion 62 includes a connecting part 621, a pair of recess parts 622, and a pair of antenna holding parts 623. The connecting part 621, the pair of recess parts 622, and the pair of antenna holding parts 623 make up a placing portion. The placing portion is placed on the opening edge part 56.

The connecting portion 621 is integrally connected to the main body portion 61 and is not rotatable. As shown in FIG. 14, an angle formed by the connecting portion 621 and the main body portion 61 is substantially equal to an angle formed by the opening edge part 56 and the peripheral surface part 54 of the basket 5. The pair of recessed parts 622 is provided on both sides of the connecting portion 621. As illustrated in FIG. 13, the recess portions 622 are engaged with the grip parts 52 when the grip parts 52 are lifted. Accordingly, the holding portion 62 is positioned on the opening edge part 56, and the wireless tag reader 6 does not rattle even if the customer moves while carrying the basket 5. The pair of antenna holding parts 623 is continuous with the pair of recess parts 622.

In order to cause the basket 5 to hold the wireless tag reader 6 having the above-described configuration, the following operation may be performed. First, in a state where the grip parts 52 are lifted (in a raised position), the recessed parts 622 are positioned with respect to the grip parts 52 from above. At this time, the main body portion 61 is aligned so as to be positioned inside the peripheral surface part 54 in the left-right direction of FIG. 13. Then, the wireless tag reader 6 is moved downward to place the connecting part 621, the pair of recessed parts 622, and the pair of antenna holding parts 623 on the opening edge part 56. As a result, the holding portion 62 is attached to the opening edge part 56, and the antenna 70 is held at the upper part of the basket 5.

According to the third embodiment, as in each of the first and second embodiments, the wireless tag reader 6 can reliably read tag information of a wireless tag attached to a commodity being put into the storage part 51 through the upper opening 55. Further, since the holding portion 62 may be placed on the opening edge part 56, the wireless tag reader 6 can be easily held in the basket 5.

Fourth Embodiment

Figure 15:
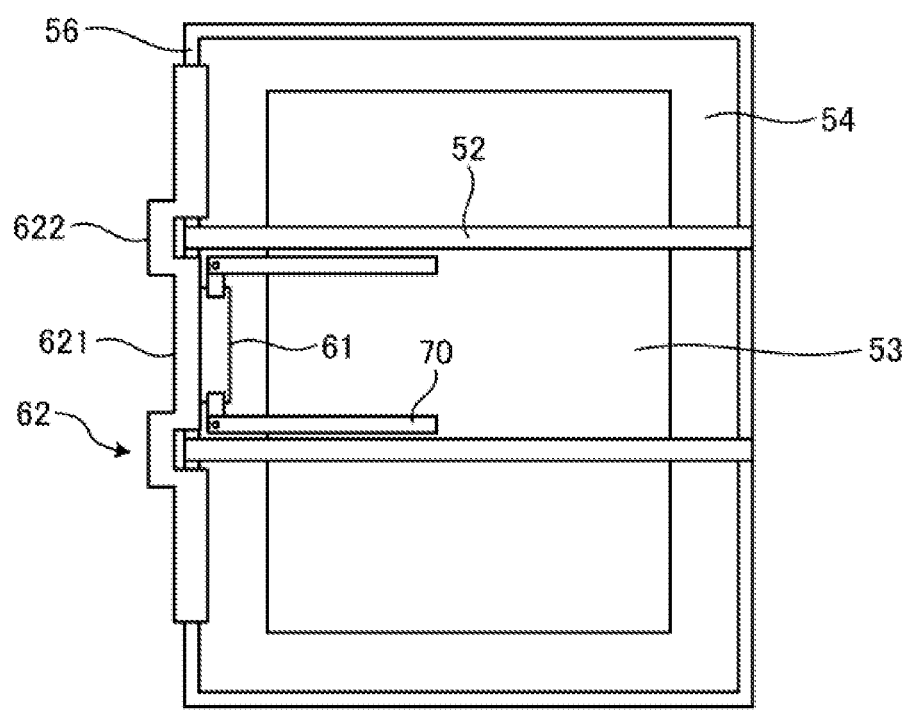
FIG. 15 is a diagram schematically illustrating an upper surface of a basket device before a wireless tag reader is attached thereto according to a fourth embodiment.

Next, a fourth embodiment of the wireless tag reader 6 will be described with reference to the drawings. FIG. 15 is a diagram schematically showing the upper surface of the basket 5 before the wireless tag reader 6 is attached to the basket 5, and FIG. 16 is a diagram schematically showing the upper surface of the basket 5 to which the wireless tag reader 6 is attached.

The wireless tag reader 6 of the fourth embodiment is different from the wireless tag reader 6 of the third embodiment in that two antennas 70 protrude from both sides of the main body portion 61 and are rotatable with respect to the main body portion 61. Each antenna 70 is formed of a monopole antenna.

To hold the wireless tag reader 6 on the basket 5, each antenna 70 is bent. Then, as in the third embodiment, the recessed parts 622 are positioned with respect to the grip parts 52 from above in a state where the grip parts 52 are lifted. In addition, when the main body portion 61 is positioned so as to be positioned inside the peripheral surface part 54, and the wireless tag reader 6 is moved downward to place the connecting part 621 and the pair of recessed parts 622 on the opening edge part 56, the state illustrated in FIG. 15 is obtained.

Figure 16:
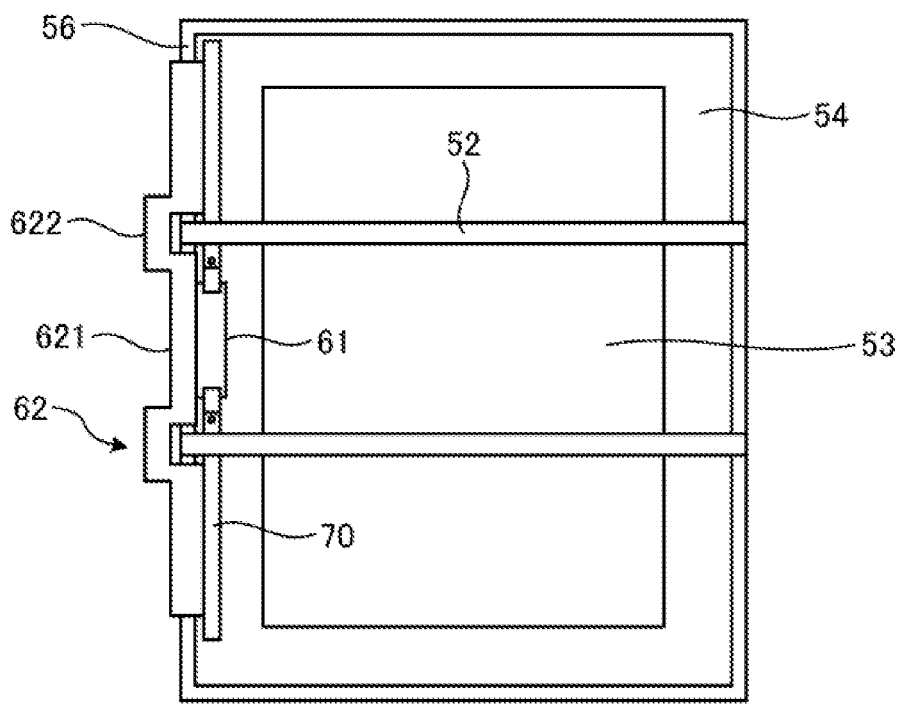
FIG. 16 is a diagram schematically illustrating an upper surface of a basket device to which a wireless tag reader is attached according to a fourth embodiment.

Next, the antennas 70 are rotated as shown in FIG. 16. As a result, the holding portion 62 is attached to the opening edge part 56, and the antennas 70 cross the grip parts 52 in the storage part 51. That is, the holding portion 62 is capable of holding the antennas 70 in a state in which the holding portion 62 intersects the grip parts 52 that are provided on the basket 5 and protrudes upward from the upper opening 55.

This fourth embodiment has the following advantages in addition to those of the third embodiment. Since each antenna 70 is provided to extend so as to intersect with the grip parts 52 therebelow, it is possible to prevent the wireless tag reader 6 from coming off in an upward direction (a direction orthogonal to the paper surface in FIG. 16).

Fifth Embodiment

Figure 17:
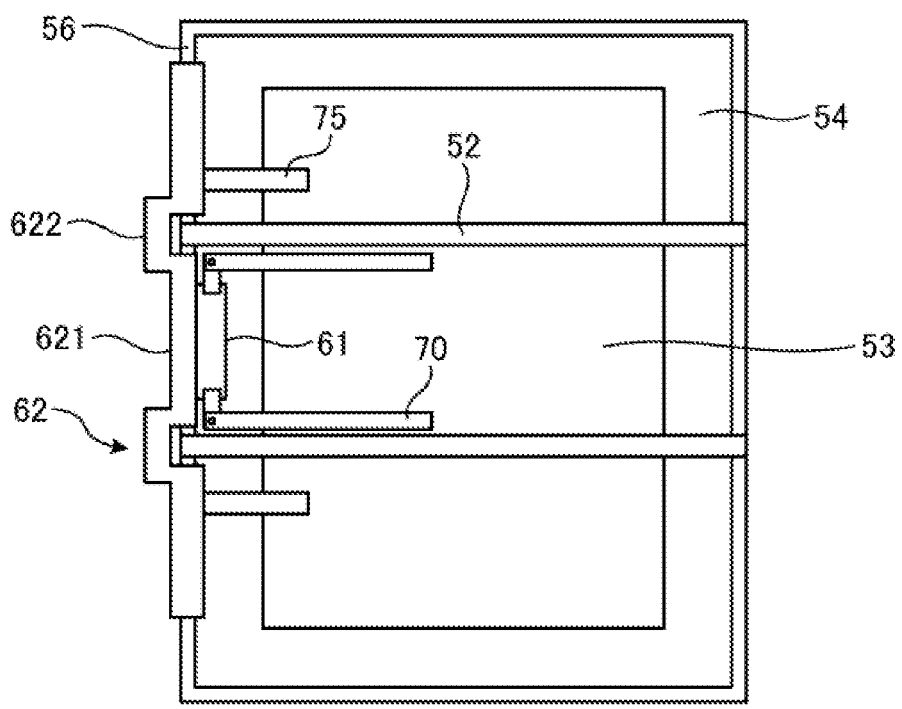
FIG. 17 is a diagram schematically illustrating an upper surface of a basket device before a wireless tag reader is attached thereto according to a fifth embodiment.
Figure 18:
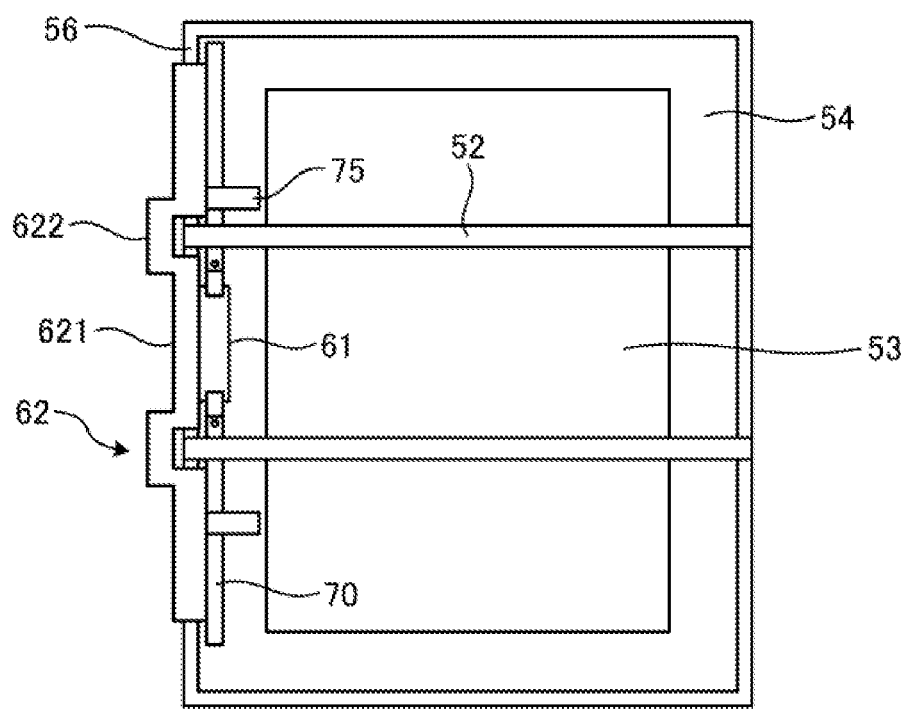
FIG. 18 is a diagram schematically illustrating an upper surface of a basket device to which a wireless tag reader is attached according to a fifth embodiment.

Next, a fifth embodiment of the wireless tag reader 6 will be described with reference to the drawings. FIG. 17 is a diagram schematically showing the upper surface of the basket 5 before the wireless tag reader 6 is attached to the basket 5, and FIG. 18 is a diagram schematically showing the upper surface of the basket 5 to which the wireless tag reader 6 is attached.

The wireless tag reader 6 of the fifth embodiment is different from the wireless tag reader 6 of the fourth embodiment in that the extended state of the antennas 70 cannot be maintained only by the stiffness of the antennas 70, and supporting members 75 are provided to maintain the antennas 70 in the extended state. Each supporting member 75 is, for example, a tape-like material having one end fixed to the holding portion 62.

In order to hold the wireless tag reader 6 in the basket 5, a state shown in FIG. 17 is obtained by the same operation as that of the fourth embodiment. Next, each antenna 70 is extended and supported by the corresponding supporting member 75 as shown in FIG. 18. For example, the free end of the supporting member 75 is fixed to the peripheral surface 54 while the supporting member 75 supports the antenna 70. As a result, the holding portion 62 is attached to the opening edge part 56, and the antennas 70 cross the grip parts 52 in the storage part 51. That is, the holding portion 62 is capable of holding the antennas 70 in a state in which the holding portion 62 intersects the grip parts 52 that are provided on the basket 5 and protrude upward from the upper opening 55. Also in the fifth embodiment, advantages similar to those of the fourth embodiment can be achieved.

As described above, the wireless tag reader 6 of the above example embodiments is detachably attached to the basket 5 for storing commodities passed through the upper opening 55, and includes an antenna 70 for transmitting and receiving radio waves to and from the RFID tags. The wireless tag reader 6 includes a reading unit 6002 for reading tag information from the RFID tags based on the radio waves received by the antenna 70 and a holding unit 62 that is connected to the antenna 70 and detachably attached to the basket 5.

For this reason, since the antenna 70 is not easily covered by commodities stored in the basket 5, it is possible to transmit and receive radio waves to and from the wireless tag attached to a commodity passing through the upper opening 55 without interference from the commodities already stored in the basket 5. Therefore, the wireless tag reader 6 can improve the reading performance of the wireless tag attached to the commodity being put into the storage part 51 through the upper opening 55.

In the wireless tag reader 6 of the above-described embodiments, the holding portion 62 includes a placing portion that is bent with respect to the antenna 70 and is placed on the opening edge part 56 of the basket 5, and the antenna 70 can thus be positioned and held inside the basket 5.

Therefore, the placing portion of the holding portion 62 can be placed on and attached to the opening edge part 56, and the antenna 70 can be disposed along the peripheral surface part 54 of the basket 5. Therefore, the wireless tag reader 6 not only allows the basket 5 to hold the antenna 70 in a compact manner, but also prevents the antenna 70 from becoming an obstacle when a commodity is put into or taken out of the basket 5.

Further, in the wireless tag reader 6 of the above-described embodiments, the placing portion of the holding portion 62 includes a recessed part that is provided in the basket 5 and engages with each of the grip parts 52 protruding upward from the opening edge part 56.

Therefore, the holding portion 62 can be positioned by the grip parts 52 of the basket 5. Therefore, the wireless tag reader 6 can suppress rattling of the holding unit 62 and the antenna 70 without complicating the structure.

In addition, in the wireless tag reader 6 of the above-described embodiments, the holding portion 62 can hold the antenna 70 in a state of intersecting with each grip part 52 of the basket 5 that protrudes upward from the opening edge part 56.

Therefore, the antenna 70 held by the basket 5 can be prevented from being detached from the basket 5.

In each example embodiment, the control program executed by the mobile device 3 and the wireless tag reader 6 may be stored in a computer-readable recording medium such as a CD-ROM and copied therefrom. The control program executed in each device described above may be stored on a computer connected to a network such as the Internet and downloaded via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag reader that is attachable to a basket for storing a tagged object, the wireless tag reader comprising:
    a body portion housing a processor;
    an antenna connected to the body portion; and
    a holding portion attachable to an upper edge part of a basket and including:
        an upper plate part that is flat and rotatably connected to the body portion,
        a lower plate part that is flat and facing the upper plate part, and
        a biasing member between the upper and lower plate parts and by which one of the upper and lower plate parts is biased towards the other while the upper edge part of the basket is sandwiched between the upper and lower plate parts.

2. The wireless tag reader according to claim 1, wherein, when the holding portion is attached to the basket, the body portion rotates with respect to the upper plate part to contact a side surface of the basket.

3. The wireless tag reader according to claim 1, wherein the lower plate part includes a protrusion protruding towards the upper plate part.

4. The wireless tag reader according to claim 1, wherein the body portion has a first surface that contacts a side surface of the basket when the holding portion is attached to the upper edge part of the basket and a second surface along which the antenna is arranged.

5. The wireless tag reader according to claim 4, wherein the body portion further houses a battery arranged along the first surface.

6. The wireless tag reader according to claim 1, further comprising:
a mesh sheet material connected to the antenna and contacting the upper edge part of the basket when the holding portion is attached to the upper edge part of the basket.

7. The wireless tag reader according to claim 6, further comprising:
a clip by which the mesh sheet material is held on the upper edge part of the basket.

8. The wireless tag reader according to claim 1, further comprising:
a first mesh sheet material connected to the antenna,
a second mesh sheet material connected to the antenna, wherein
the first and second mesh sheet materials extend in opposite directions from the antenna, and
the first sheet material has a first engaging portion configured to engage a second engaging portion of the second mesh sheet material across a side surface of the basket.

9. The wireless tag reader according to claim 1, wherein the holding portion includes a recess that is engageable with a rotatable handle of the basket.

10. The wireless tag reader according to claim 9, wherein the antenna extends from the body portion and is rotatable with respect to the body portion.

11. The wireless tag reader according to claim 10, further comprising:
a supporting member by which the antenna is held along a side surface of the basket.

12. A basket device, comprising:
a basket in which an object can be stored; and
a wireless tag reader detachably attached to the basket and including:
a body portion housing a processor,
an antenna connected to the body portion, and
a holding portion detachably attached to an upper edge part of the basket and including:
an upper plate part that is flat and rotatably connected to the body portion,
a lower plate part that is flat and facing the upper plate part, and
a biasing member between the upper and lower plate parts and by which one of the upper and lower plate parts is biased towards the other while the upper edge part of the basket is sandwiched between the upper and lower plate parts.

13. The basket device according to claim 12, wherein
the basket has a bottom surface and a plurality of side surfaces connected to the bottom surface, and
one of the side surfaces includes the upper edge part of the basket to which the holding portion is detachably attached.

14. The basket device according to claim 13, wherein when the body portion contacts said one of the side surfaces.

15. The basket device according to claim 12, wherein the lower plate part includes a protrusion protruding towards the upper plate part.

16. The basket device according to claim 12, wherein the body portion has a first surface that contacts a side surface of the basket and a second surface along which the antenna is arranged.

17. The basket device according to claim 16, wherein the body portion further includes a battery arranged along the first surface.

18. The basket device according to claim 12, wherein the wireless tag reader further includes a mesh sheet material connected to the antenna and contacting the upper edge part of the basket.

19. The basket device according to claim 18, further comprising:
a clip by which the mesh sheet material is held on the upper edge part of the basket.

20. The basket device according to claim 12, wherein
the basket includes a rotatable handle, and
the holding portion includes a recess that is engageable with the handle.

* * * * *